US007512889B2

(12) United States Patent
Newell et al.

(10) Patent No.: US 7,512,889 B2
(45) Date of Patent: Mar. 31, 2009

(54) METHOD AND SYSTEM FOR CONTROLLING PRESENTATION OF INFORMATION TO A USER BASED ON THE USER'S CONDITION

(75) Inventors: Dan Newell, Seattle, WA (US); Kenneth H. Abbott, III, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 182 days.

(21) Appl. No.: 11/069,907

(22) Filed: Feb. 28, 2005

(65) Prior Publication Data

US 2006/0053377 A1  Mar. 9, 2006

Related U.S. Application Data

(63) Continuation of application No. 09/892,198, filed on Jun. 25, 2001, now Pat. No. 6,874,127, which is a continuation of application No. 09/216,193, filed on Dec. 18, 1998, now Pat. No. 6,466,232.

(51) Int. Cl.
G06F 3/00 (2006.01)

(52) U.S. Cl. .................. 715/741; 715/740; 715/744; 715/747; 709/201; 709/223; 706/45; 706/61

(58) Field of Classification Search ......... 715/795–708, 715/734–748; 709/217, 228, 201, 202, 223, 709/224; 706/45, 50, 60, 61
See application file for complete search history.

(56) References Cited

U.S. PATENT DOCUMENTS 4,905,163 A * 2/1990 Garber et al. .............. 706/55

(Continued)

FOREIGN PATENT DOCUMENTS

EP  0 823 813 A2  2/1998

(Continued)

OTHER PUBLICATIONS

Steven G. Goodridge, "The Environment understanding interface: detecting and tracking human activity through multimedia sensors," 1995.*

(Continued)

Primary Examiner—Tadeese Hailu
(74) Attorney, Agent, or Firm—Amin, Turocy & Calvin, LLP

(57) ABSTRACT

A system for controlling presentation of information to a user based on the user's current condition. In particular, the system monitors the user and the user's environment, and creates and maintains an updated model of the current condition of the user. The user condition can include a variety of condition variables, including abstract concepts such as the user's current cognitive load, desired level of privacy for output information, and desired scope of audience for output information. Upon receiving output information to be presented to the user (e.g., from an application program), the system determines an appropriate output device and an appropriate format with which to present the information to the user, and then presents the output information. The system can also receive description information about the output information that describes relevant factors for determining when and how to present the output information (e.g., the importance and urgency of the output information, the consequences of the user not receiving or ignoring the output information, etc.). Some versions of the system execute on a wearable computer having a variety of available output display devices.

20 Claims, 9 Drawing Sheets

U.S. PATENT DOCUMENTS

| | | | | |
|---|---|---|---|---|
| 4,916,441 | A | 4/1990 | Gombrich | 340/712 |
| 5,032,083 | A | 7/1991 | Friedman | 434/112 |
| 5,201,034 | A | 4/1993 | Matsuura et al. | 395/155 |
| 5,208,449 | A | 5/1993 | Eastman et al. | 235/462 |
| 5,214,757 | A | 5/1993 | Mauney et al. | 395/161 |
| 5,227,614 | A | 7/1993 | Danielson et al. | 235/380 |
| 5,278,946 | A * | 1/1994 | Shimada et al. | 706/53 |
| 5,335,276 | A | 8/1994 | Thompson et al. | 380/21 |
| 5,388,198 | A | 2/1995 | Layman et al. | 395/155 |
| 5,416,730 | A | 5/1995 | Lookofsky | 364/708.1 |
| 5,470,233 | A | 11/1995 | Fruchterman et al. | 434/112 |
| 5,493,692 | A * | 2/1996 | Theimer et al. | 455/26.1 |
| 5,539,665 | A | 7/1996 | Lamming et al. | 364/514 R |
| 5,555,376 | A | 9/1996 | Theimer et al. | 395/200.09 |
| 5,559,520 | A | 9/1996 | Barzegar et al. | 342/357 |
| 5,568,645 | A | 10/1996 | Morris et al. | 395/800 |
| 5,601,435 | A | 2/1997 | Quy | 434/307 R |
| 5,611,050 | A | 3/1997 | Theimer et al. | 395/200.09 |
| 5,642,303 | A | 6/1997 | Small et al. | 364/705.05 |
| 5,646,629 | A | 7/1997 | Loomis et al. | 342/357 |
| 5,719,744 | A | 2/1998 | Jenkins et al. | 361/683 |
| 5,726,660 | A | 3/1998 | Purdy et al. | 342/357 |
| 5,751,260 | A | 5/1998 | Nappi et al. | 345/8 |
| 5,761,662 | A * | 6/1998 | Dasan | 707/10 |
| 5,781,913 | A | 7/1998 | Felsenstein et al. | 707/501 |
| 5,790,974 | A | 8/1998 | Tognazzini | 701/204 |
| 5,798,733 | A | 8/1998 | Ethridge | 342/357 |
| 5,812,865 | A * | 9/1998 | Theimer et al. | 709/228 |
| 5,873,070 | A | 2/1999 | Bunte et al. | 705/28 |
| 5,878,274 | A * | 3/1999 | Kono et al. | 710/8 |
| 5,902,347 | A | 5/1999 | Backman et al. | 701/200 |
| 5,910,799 | A | 6/1999 | Carpenter et al. | 345/333 |
| 5,938,721 | A | 8/1999 | Dussell et al. | 701/211 |
| 5,948,041 | A | 9/1999 | Abo et al. | 701/207 |
| 5,959,611 | A | 9/1999 | Smailagic et al. | 345/156 |
| 5,966,533 | A * | 10/1999 | Moody | 717/100 |
| 5,991,687 | A | 11/1999 | Hale et al. | 701/207 |
| 6,014,638 | A | 1/2000 | Burge et al. | 705/27 |
| 6,047,301 | A | 4/2000 | Bjorklund et al. | 708/139 |
| 6,064,943 | A | 5/2000 | Clark, Jr. et al. | 702/2 |
| 6,108,197 | A | 8/2000 | Janik | 361/683 |
| 6,127,990 | A | 10/2000 | Zwern | 345/8 |
| 6,195,622 | B1 * | 2/2001 | Altschuler et al. | 703/2 |
| 6,230,111 | B1 * | 5/2001 | Mizokawa | 702/182 |
| 6,405,159 | B2 * | 6/2002 | Bushey et al. | 703/13 |
| 6,571,279 | B1 | 5/2003 | Herz et al. | 709/217 |

FOREIGN PATENT DOCUMENTS

| | | |
|---|---|---|
| JP | 5-260188 | 10/1993 |
| JP | 9-091112 | 4/1997 |
| WO | WO 90/08361 | 7/1990 |
| WO | WO 9703434 | 1/1997 |

OTHER PUBLICATIONS

Ulf Leonhardt and Jeff Magee, "Multi-Sensor Location Tracking," Department of Computing, London, UK, Oct. 1998.*
Rosis et al., "Adaptive Interaction with Knowledge-Based System," ACM 1994.*
Brown et al., "Utility Theory-Based User Models for Intelligent Interface Agents," Jun. 1998.*
"'Affective Understanding:' Modeling and Responding to User Affect," http://www.media.mit.edu/affect/AC_research/understanding.html, pp. 1-3, retrieved Oct. 2, 1998.
"Alps GlidePoint," http://www.alps.com/p17.html, p. 1, retrieved Oct. 2, 1998.
"GyroPoint Technology," http://www.gyration.com/html/gyropoint.html, pp. 1-3, retrieved Oct. 2, 1998.
"Haptics," http://www.ai.mit.edu/projects/handarm-haptics/haptics.html, pp. 1-2, retrieved Oct. 2, 1998.
"Research Areas in Affective Computing," http://www.media.mit.edu/affect/, p. 1, retrieved Oct. 2, 1998.
"Research on Affective Pattern Recognition and Modeling," http://www.media.mit.edu/affect/AC_research/ recognizing.html, pp.1-4, retrieved Oct. 2, 1998.
"Research on Sensing Human Affect," http://www.media.mit.edu/affect/AC_research/sensing.html, pp. 1-5, retrieved Oct. 2, 1998.
"Smart Rooms," http://vismod.www.media.mit.edu/vismod/demos/smartroom/, pp. 1-3, retrieved Oct. 2, 1998.
"SmartDesk Home Page," http://vismod.www.imedia.mit.edu/vismod/demos/smartdesk/, pp. 1-4, retrieved Oct. 2, 1998.
"The MIT Wearable Computing Web Page," http://wearables.www.media.mit.edu/projects/wearables/, pp. 1-3, retrieved Oct. 2, 1998.
"Wearable Computer Systems for Affective Computing," http://www.media.mit.edu/affect/AC_research/wearables.html, pp. 1-5, retrieved Oct. 2, 1998.
Bauer et al., "A Collaborative Wearable System with Remote Sensing," University of Oregon, Feb. 1996.
Billinghurst, M., et al., "New Ways to Manage Information," IEEE, pp. 57-64, Jan. 1999.
Fickas, S., et al., "Software Organization for Dynamic and Adaptable Wearable Systems," University of Oregon, 1997, 8 pages.
Finger et al., "Rapid Design and Manufacture of Wearable Computers," Communications of the ACM, vol. 39, No. 2, Feb. 1996, pp. 63-68.
Gabbard, J., et al., "A Taxonomy of Usability Characteristics in Virtual Environments," Nov. 1997, http://csgrad.cs.vt.edu/~jgabbard/ve/taxonomy/, 190 pages.
Gavrilova, T., et al., "An Approach to Mapping of User Model to Corresponding Interface Parameters," 1997, pp. 24-29, http://citeseer.ist.psu.edu/cache/papers/cs/2756/http:zSzzSzwww.cs.unisb.dezSzUM97zSzVSzSzZzSzGavrilovaT.pdf/gavrilova97approach.pdf.
Hull et al., "Towards Situated Computing," Hewlett-Packard Laboratories, HPL-97-66 (1997).
Jakobovits, R., "Integrating Autonomous Heterogeneous Information Sources," Jul. 15, 1997.
Kirsch, D., "The Sentic Mouse: A Tool for Measuring Emotional Valence," http://www.media.mit.edu/affect/AC_research/projects/sentic_mouse.html, pp. 1-2, retrieved Oct. 2, 1998.
Kortuem et al., "Context-Aware, Adaptive Wearable Computers as Remote Interfaces to 'Intelligent' Environments," University of Oregon, Oct. 1998.
Lashkari, Y., et al., "Collaborative Interface Agents," *Proceedings of AAAI '94 Conference*, Seattle, Washington, Aug. 1994.
Lunt, T., et al., "Knowledge-Based Intrusion Detection," Proceedings of the Annual-Artificial Intelligence Systems in Government Conference, IEEE Comp. Soc. Press, vol. Conf. 4, 1989, pp. 102-107.
Maes, P., "Agents that Reduce Work and Information Overload," *Communications of the ACM*, vol. 37, No. 7, Jul. 1994.
Mann, S., "'Smart Clothing': Wearable Multimedia Computing and 'Personal Imaging' to Restore the Technological Balance Between People and Their Environments," Proceedings, ACM Multimedia 96, Nov. 18-22, 1996, pp. 163-174.
Metz, C., "MIT: Wearable PC's, Electronic Ink, and Smart Rooms," PC Magazine, pp. 192-193, Jun. 1998.
Oakes, C., "The Truman Show Realized?," retrieved Oct. 21, 1998, from http://www.wired.com/news/news/technology/story/15745.html, pp. 1-4.
Picard, R., et al., "Affective Wearables," Personal Technologies 1:231-240, MIT Media Laboratory, 1997.
Rekimoto et al., "The World Through the Computer: Computer Augmented Interaction with Real World Environments," Symposium on User Interface Software and Technology (IST '95) ACM Press, Nov. 1995, pp. 29-36.
Rhodes, B., "The Wearable Remembrance Agent: A System for Augmented Memory," Proceedings of the First International Symposium on Wearable Computers (ISW '97), Cambridge, MA, Oct. 13-14, 1997.
Rhodes, B., "WIMP Interface Considered Fatal," retrieved Oct. 2, 1998, from http://rhodes.www.media.mit.edu/people/rhodes/Papers/no-wimp.html, pp. 1-3.

Sato, J., et al., "Autonomous Behavior Control of Virtual Actors Based on the AIR Model," Proceedings Computer Animation, Jun. 5, 1997.

Smailagic et al., "Matching Interface Design with User Tasks: Modalities of Interaction with CMU Wearable Computers," IEEE Personal Communications, Feb. 1996, pp. 14-25.

Starner et al., "Visual Contextual Awareness in Wearable Computing," Media Lab, MIT, Oct. 1998, 8 pages.

Tan, H., et al., "Tactual Displays for Wearable Computing," IEEE, Massachusetts Institute of Technology Media Laboratory, pp. 84-88, 1997.

* cited by examiner

Fig. 3

| Model of User Condition | | 210 |
|---|---|---|
| User: X   Time: 14:22   Date 10/15/XX | | |
| Latitude | 37°55.3' N | |
| Longitude | 95°24.7' W | |
| Altitude | 102' | |
| Heart Rate | 57 beats/minute | |
| Blood Pressure | 125 / 80 | |
| Last User Input | Voice Command "Stop Recording" | |
| Ambient Temperature | 67°F | |
| Ambient Noise | 20 dB | |
| Location | Office | |
| Speed | 2 MPH | +/- 10% |
| Nearby Objects | Desk | |
| Nearby People | Physical: None. Audio: "Doug Smith" | |
| | | |
| User Activity | Talking on Cell Phone, Walking | Highly Likely |
| Cognitive Load | 77 | |
| Level of Privacy | Company, Executive | |
| Scope of Audience | Self | |
| | | |
| Application X-Factor 1 | Normal: Mean-23, Std Dev 3 | |
| | | |
| User Format Preference | Visual > Auditory | |
| User Device Preference | Eyeglass Mounted Display | |

Fig. 4  User Characterization Module 205

| User: X |
|---|
| IF  <Latitude> ≈ "37°55.2'N" AND <Longitude> ≈ "95°24.7'W" THEN <Location> = "Office" |
| IF  <Infrared.Link.To.Desktop> = True THEN <Nearby Objects> Includes "Desk" |
| IF  <Voice.Recognition.ID> <> "X" AND <Speakerphone.Status> = "Disabled" THEN <Nearby People> Includes ValueOf<Voice.Recognition.ID> |
| IF  <Desktop.Motion.Sensor.Human.Movement> = True AND <User Activity> Includes "Seated" THEN <Nearby People.Physical> Includes "Unidentified Person" |
| IF  <User Activity> = "Walking" THEN <Cognitive Load> = 20 |
| IF  <User Activity> = "Talking *" THEN <Cognitive Load> = 55 |
| IF  <User Activity> Includes "Walking" AND <User Activity> Includes "Talking On Cell Phone" THEN <Cognitive Load> = 77 |
| WHILE <Output.To.User> = True THEN <Cognitive Load> = +10 |
| WHILE <User.Mood> Includes "Angry" THEN <Cognitive Load> = +20% |
| IF  <Nearby People.*> Includes Only [Company Executives] THEN <Level Of Privacy> Includes "Executive" |
| IF  <Nearby People.*> Includes Only [Company Employees] THEN <Level of Privacy> Includes "Company" |
| IF  <Nearby People.Physical> = "None" THEN <Scope of Audience> = "Self" |
| IF  <Output.Intrusive.To.Others> = "Likely" THEN <Scope of Audience> = "Self" |
| AppX:IF <Application X-Factor 1.Mean> > 25 THEN <Application X Output> = "Undesired" WITH Likelihood "Likely" |
| IF  (<Current.Time> - <Time.Of.Last.User.Input>) > 5 minutes THEN <Interacting.With.Computer> = False WITH Likelihood "Somewhat Likely" |

*Fig. 5*  Output Device Selector Module 215

User: X

| Device | Currently Available | In Use | Supported Senses | Cognitive Load | Level of Privacy | Scope of Audience | Degree of Interruptibility | Degree of Intrusiveness on Others |
|---|---|---|---|---|---|---|---|---|
| Handheld Flat Panel Display 130 | X | | Visual, Audio | Very Low-Medium | All | Self [+3] | Low | Very Low |
| Earpiece Speaker 132 | X | X | Audio | Very Low-Somewhat High | All | Self | Low-Very High | Very Low |
| Eyeglass Mounted Display 134 | X | | Visual | Very Low-Somewhat Low | All | Self | Medium-High | Very Low |
| Tactile Display 136 | X | | Tactile | Very Low-Very High | All | Self | Very Low-Very High | Very Low |
| Display 160 | X | | Visual | Very Low-Somewhat High | Business, Sensitive | Self +6 | Low-Medium | Very Low-Medium |
| Speaker 162 | X | | Audio | Low-Somewhat High | Business | Many | Medium-High | Low-Very High |
| Olfactory Device 164 | X | | Olfactory | Medium-Somewhat High | Close Friends | Many | Very Low-Somewhat Low | Medium-Very High |
| Printer 166 | X | | Visual | Very Low-Very High | Business | Unlimited | Very Low | Somewhat High |
| Telephone 168 | X | | Audio | Very Low-Medium | Family | Self | High-Very High | High-Very High |
| Pager 502 | | | Visual, Audio, Tactile | Very Low-High | All | Self | Medium-High | Medium-Very High |
| Cellular Telephone 504 | | | Audio | Very Low-Medium | Highly Sensitive | Self | Medium-High | High-Very High |
| Car Radio 506 | | | Audio | Low-Somewhat High | Sensitive | Self + Few | Low-High | High |
| | | | | | | | | |

METHOD AND SYSTEM FOR CONTROLLING PRESENTATION OF INFORMATION TO A USER BASED ON THE USER'S CONDITION

CROSS REFERENCE TO RELATED APPLICATIONS

This application is a continuation of co-pending U.S. patent application Ser. No. 09/892,198, flied Jun. 25, 2001, which is a continuation of U.S. patent application Ser. No. 09/216,193, entitled "Method And System For Controlling Presentation Of Information To A User Based On The User's Condition" and filed Dec. 18, 1998, which are hereby incorporated by reference in their entirety.

TECHNICAL FIELD

The present invention relates generally to computer program user interfaces, and more particularly to presenting information to a user based on the user's current condition.

BACKGROUND OF THE INVENTION

As computers become increasingly powerful and ubiquitous, users increasingly use their computers for a broad variety of tasks. For example, in addition to traditional activities such as running word processing and database applications, users increasingly use computers as an integral part of their daily lives. Programs to schedule activities, generate reminders, and provide rapid communication capabilities are becoming increasingly popular. Moreover, computers are increasingly present during virtually all of a person's daily activities. For example, hand-held computer organizers (e.g., PDAs) are increasingly common, and communication devices such as portable phones are increasingly incorporating computer capabilities. Thus, users may be presented with output information from one or more computers at any time.

While advances in hardware make computers increasingly ubiquitous, traditional computer programs are not typically designed to efficiently present information to users in a wide variety of environments. For example, most computer programs are designed with a prototypical user being seated at a stationary computer with a large display device, and with the user devoting full attention to the display. In that environment, the computer can safely present information to the user at any time, with minimal risk that the user will fail to perceive the information or that the information will disturb the user in a dangerous manner (e.g., by startling the user while they are using power machinery or by blocking their vision while they are moving with information sent to a head-mounted display). However, in many other environments these assumptions about the prototypical user are not true, and users thus may not perceive output information (e.g., failing to notice an icon or message on a hand-held display device when it is holstered, or failing to hear audio information when in a noisy environment or when intensely concentrating). Similarly, some user activities may have a low degree of interruptibility (i.e., ability to safely interrupt the user) such that the user would prefer that the presentation of low-importance or of all information be deferred, or that information be presented in a non-intrusive manner.

In addition to assuming that a user is devoting full attention to the display, current computer programs typically assume that only the user is devoting attention to the computer system. Thus, current computer programs are not concerned with factors related to the user's environment, such as whether other people around the user are disturbed by information being presented or whether sensitive information is inadvertently made available to others. Instead, current computer programs typically assume that the user will request output information only at appropriate times and that the user will control whether others are privy to output information (e.g., by orienting the display accordingly or adjusting speaker volumes).

However, as computers are increasingly present with users and are designed to present output information other than at a user's immediate request (e.g., reminding the user of an upcoming appointment), computer programs are increasingly likely to present information in a manner that interrupts the user (and may be bothersome or dangerous), that may not be perceived by the user even if highly important and urgent, that may disturb others around the user, and that may inadvertently reveal sensitive information to others.

A growing trend of using wearable computers will only exacerbate this problem. Such wearable computers are designed to act as constant companions and intelligent assistants to a user, thus being available to receive input from the user at any time and to present output information to the user at any time. Wearable computers are typically strapped to the user's body or mounted in a holster, and may include a variety of both input and output devices. The close association of wearable computers to their users results in the wearable computer interacting with the user in virtually any social or business situation, and thus the likelihood of inappropriate output behavior increases.

SUMMARY OF THE INVENTION

Some embodiments of the present invention provide a method and system for controlling presentation of information to a user based on the user's current condition. In particular, the system monitors the user and the user's environment, and creates and maintains an updated model of the current condition of the user. The user condition can include a variety of condition variables, including abstract concepts such as the user's current cognitive load, desired level of privacy for output information, and desired scope of audience for output information. The user condition can also include condition variables indicating physical characteristics (e.g., deafness) and physically observable characteristics (e.g., movement or proximity to another object) of the user. Upon receiving output information to be presented to the user (e.g., from an application program), the system determines an appropriate output device and an appropriate format with which to present the information to the user, and then presents the output information. In some embodiments, the system also receives description information about the output information that describes relevant factors for determining when and how to present the output information (e.g., the importance and urgency of the output information, the consequences of the user not receiving or ignoring the output information, etc.). The system executes in some embodiments on a wearable computer having a variety of available output display devices.

In one embodiment, the system presents output information to a user by first receiving information about a modeled characteristic of the user which may include a modeled preference of the user for receiving sensitive information, a modeled indication of a current degree of interruptibility of the user, or a modeled preference of the user for an amount of people to perceive information presented by the computer. The system then selects an output device capable of presenting the output information in accordance with the modeled characteristic, and presents the output information on the selected output device in accordance with the modeled characteristic.

In an alternate embodiment, the system presents information to a user on one of multiple available output devices. The system monitors the user to collect information about a current state of the user, and then models a current user condition based on the collected information by determining a current level of privacy desired by the user that indicates a group of people allowed to perceive information presented by the computer, by determining a current scope of audience desired by the user that indicates how many people are intended to perceive information presented by the computer, and by determining a current cognitive load of the user that indicates ability of the user to devote attention to the computer. The system then receives output information to be presented to the user, and presents the output information in a manner consistent with the modeled current user condition by selecting one of the output devices such that information presentation capabilities of the selected output device support the determined current desired level of privacy, the determined current desired scope of audience, and the determined current cognitive load, and by presenting the output information to the user on the selected output device, so that the presentation of information by the system satisfies the modeled current user condition.

BRIEF DESCRIPTION OF THE DRAWINGS

FIG. 3 is an illustrative example of a model of a current user condition.

FIG. 4 is an illustrative example of a User Characterization Module.

FIG. 5 is an illustrative example of an Output Device Selector Module.

DETAILED DESCRIPTION OF THE INVENTION

Figure 1:
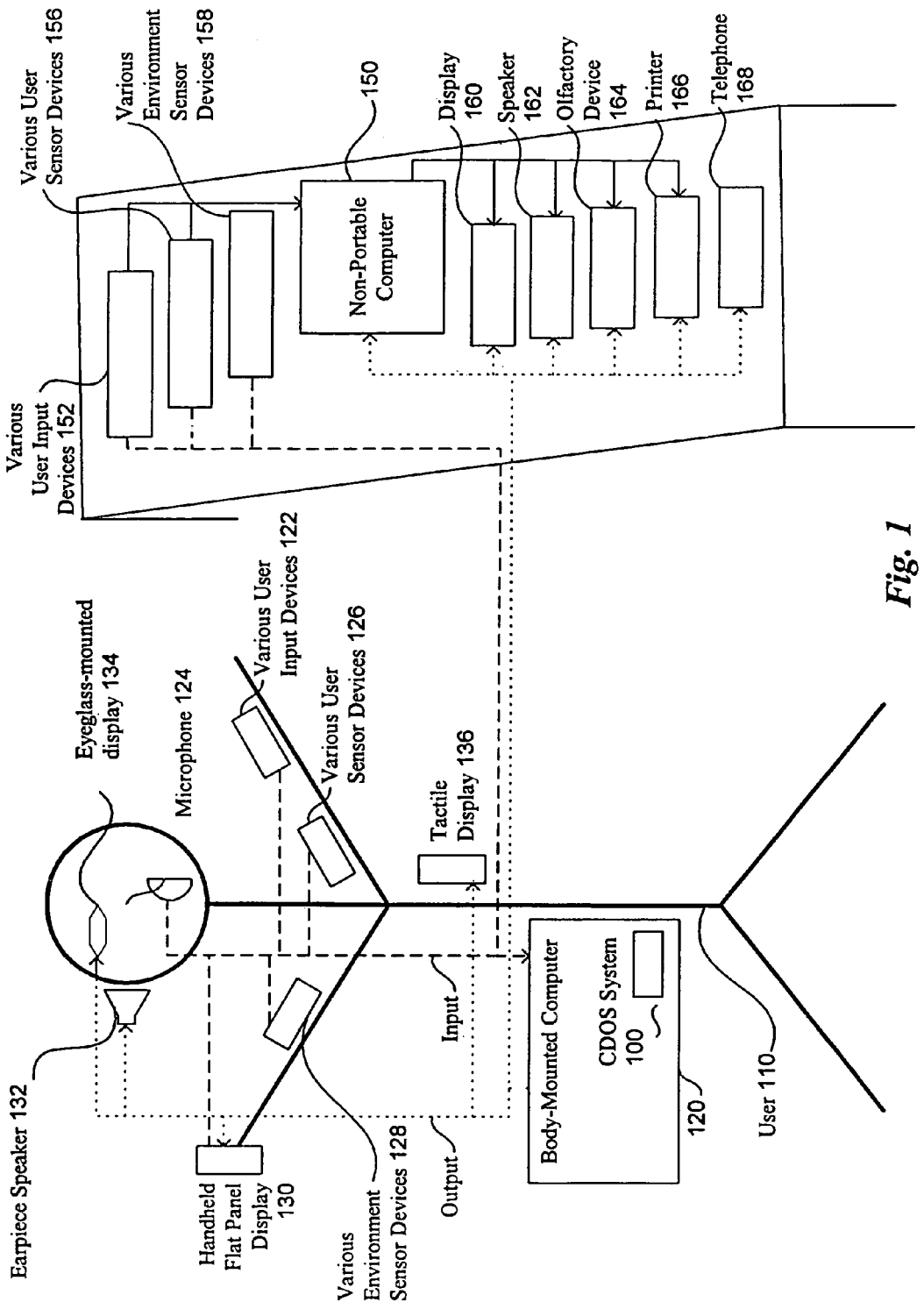
FIG. 1 illustrates a user wearing a body-mounted computer executing an embodiment of the Condition-Dependent Output Supplier (CDOS) system of the present invention.

An embodiment of the present invention provides a method and system for controlling presentation of information to a user based on the user's current condition. In particular, the Condition-Dependent Output Supplier (CDOS) system monitors the user and the user's environment, and creates and maintains an updated model of the current condition of the user. Upon receiving output information to be presented to the user (e.g., from an application program), the CDOS system determines an appropriate output device and an appropriate format with which to present the information to the user, and then presents the output information. In some embodiments, the CDOS system also receives description information about the output information that describes relevant factors for determining when and how to present the output information (e.g., the importance and urgency of the output information, the consequences of the user not receiving or ignoring the output information, etc.).

In one embodiment, the model of the user's current condition includes a variety of condition variables that represent information about the user and the user's environment at varying levels of abstraction. For example, information about the user at a low level of abstraction can include raw physiological data (e.g., heart rate and EKG) and geographic information (e.g., location and speed), while higher levels of abstraction may attempt to characterize or predict the user's physical activity (e.g., jogging or talking on a phone), emotional state (e.g., angry or puzzled), desired output behavior for different types of information (e.g., to present private family information so that it is perceivable only to myself and my family members), and cognitive load (i.e., the amount of attention required for the user's current activities). Background information which changes rarely or not at all can also be included, such as the user's age, gender and visual acuity. The model can similarly hold environment information at a low level of abstraction, such as air temperature or raw data from a motion sensor, or at higher levels of abstraction, such as the number and identities of nearby people, objects, and locations. The model of the user's condition can additionally include information added explicitly from other sources (e.g., application programs), as well as user-specified or system-learned defaults and preference information. An illustrative example of a model of a user condition is described in greater detail with respect to FIG. 3.

The CDOS system includes a User Characterization Module, an Output Device Selector Module, and a Format Module associated with each available output device. The User Characterization Module monitors the user and the user's environment in order to create a current model of the user's condition. After the User Characterization Module has created a model of the user's current condition, the Output Device Selector Module and the one or more Format Modules can then use the model to determine when and how to present output information to the user.

The User Characterization Module can receive a variety of types of information, and can use this information to determine the user's current condition in a variety of ways. For example, the User Characterization Module can receive user input supplied by the user to the computer system, information about the user sensed from a variety of sensor devices, information about the environment surrounding the user received from a variety of sensor devices, indications from the CDOS system about output information currently being presented to the user, stored background information about the user or about the world, and various types of information from external entities such as application programs.

User input information alone can provide significant information to the CDOS system about the user's current condition. For example, if the user is currently supplying input to the computer via a full-sized keyboard, it is likely that the user is engaged in little other physical activity (e.g., walking), that the user is devoting a significant amount of attention to the computer system, and that the user would see information flashed on the display. If the user is instead generating user input audibly (e.g., through a head-mounted microphone), that fact may provide less user condition information to the CDOS system since the user can supply such audio information while engaged in a variety of types of physical activity. Those skilled in the art will appreciate that there are a wide variety of input devices with which a user can supply information to the computer system, including voice recognition devices, traditional qwerty keyboards, chording keyboards, half qwerty keyboards, dual forearm keyboards, chest mounted keyboards, handwriting recognition and digital ink devices, a mouse, a track pad, a digital stylus, a finger or glove device to capture user movement, pupil tracking devices, a gyropoint, a trackball, a voice grid device, digital cameras (still and motion), etc.

In addition to the information received via user input, the User Characterization Module also uses sensed information about the user. For example, a variety of sensors can provide information about the current physiological state of the user, geographical and spatial information (e.g., location and altitude), and current user activities. Some devices, such as a microphone, can provide multiple types of information. For example, if a microphone is available, the microphone can provide sensed information related to the user (e.g., detecting that the user is talking, snoring, or typing) when not actively being used for user input. Other user-worn body sensors can provide a variety of types of information, including that from thermometers, sphygmometers, heart rate sensors, shiver response sensors, skin galvanometry sensors, eyelid blink sensors, pupil dilation detection sensors, EEG and EKG sensors, sensors to detect brow furrowing, blood sugar monitors, etc. In addition, sensors elsewhere in the near environment can provide information about the user, such as motion detector sensors (e.g., whether the user is present and is moving), badge readers, still and video cameras (including low light, infra-red, and x-ray), remote microphones, etc. These sensors can be both passive (i.e., detecting information generated external to the sensor, such as a heart beat) or active (i.e., generating a signal to obtain information, such as sonar or x-rays).

Stored background information about the user can also be supplied to the User Characterization Module. Such information typically includes information about the user that changes at most infrequently, although it is possible to frequently update the stored background information to reflect changing conditions. For example, background information about the user can include demographic information (e.g., race, gender, age, religion, birthday, etc.) if it can affect how information is presented to the user. User preferences, either explicitly supplied or learned by the system, can also be stored as background information. Information about the user's physical or mental condition which affects the type of information which the user can perceive, such as blindness, deafness, paralysis, or mental incapacitation, is also important background information that allows the CDOS system to adapt to the user's capabilities.

In addition to information related directly to the user, the User Characterization Module also receives and uses information related to the environment surrounding the user. For example, devices such as microphones or motion sensors may be able to detect whether there are other people near the user and whether the user is interacting with those people. Sensors can also detect environmental conditions which may affect the user, such as air thermometers or geigercounters. Sensors, either body-mounted or remote, can also provide information related to a wide variety of user and environment factors including location, orientation, speed, direction, distance, and proximity to other locations (e.g., GPS and differential GPS devices, orientation tracking devices, gyroscopes, altimeters, accelerometers, anemometers, pedometers, compasses, laser or optical range finders, depth gauges, sonar, etc.). Identity and informational sensors (e.g., bar code readers, biometric scanners, laser scanners, OCR, badge readers, etc.) and remote sensors (e.g., home or car alarm systems, remote camera, national weather service web page, a baby monitor, traffic sensors, etc.) can also provide relevant environment information.

In addition to receiving information directly from low-level sensors, the User Characterization Module can also receive information from devices which aggregate low-level information into higher-level data constructs (e.g., face recognizers, gesture recognition systems, affective/emotion recognizers, etc.). The user can also explicitly supply information about their current condition (e.g., "I have a high cognitive load and do not want to be disturbed," "I am dealing with private family information that should not be made available to anyone outside my immediate family," or "I am in an environment where I do not wish to disturb others around me"). The CDOS system can also receive current date and time information in order to both track changes over time and to utilize information such as the user's stored schedule. Previously-created models of the user's condition can also be retrieved and used as a default or to detect changing conditions. The Output Device Selector Module can also supply information indicating the types of output currently being presented to the user, thus providing information about the user's current activities and cognitive load. Finally, other entities (e.g., application programs) can directly provide user condition information (e.g., new condition variables, whether application-specific or not, or new values for existing condition variables).

In some embodiments, CDOS systems communicate between themselves, such as via a wireless medium or when cabled together. This intercommunication can occur automatically, or at the instruction of one or more of the users of the communicating CDOS systems. When multiple CDOS systems communicate, a variety of types of information can be passed between the CDOS systems. For example, a first CDOS system receiving information from other CDOS systems can use those systems as a type of remote sensor in which information received by the User Characterization Modules of the other CDOS systems is also supplied as input to the User Characterization Module of the first CDOS system. Other CDOS systems may have access to information about the surrounding environment (e.g., a digital camera) that the first CDOS system does not have. Alternately, information about the users of the CDOS systems can be exchanged to facilitate further communication between the CDOS systems or between the users (e.g., notifying one user that another user has a high cognitive load and does not wish to be disturbed). Multiple CDOS systems can also act as cooperative systems in which one or more users' CDOS systems are shared with other users (e.g., making available excess computing power or the use of an output device).

After the User Characterization Module receives information about the user and the surrounding environment from one or more information sources, the User Characterization Module will use this information to create a current model of the user's condition. In one embodiment, the User Characterization Module merely stores the data it receives (even when it is at a low-level of abstraction) and then allows the Output Device Selector Module or application programs to directly use that stored information when making decisions related to presenting output information. In an alternate embodiment, the User Characterization Module uses received low-level data to generate higher-level representations of the user's observable activities (e.g., walking, watching a movie in a movie theater, talking to coworkers at the office, etc.).

In yet another embodiment, the User Characterization Module further characterizes the user's condition with respect to condition variables that are not directly observable.

Such condition variables include the current cognitive load of the user (indicating amount of attention required for the user's current activities and thus the ability of the user to devote attention to the computer), the current degree of interruptibility for the user (indicating ability to safely interrupt the user), the current degree of intrusiveness of output on the environment (indicating impact of output on the surrounding environment), the user's desired scope of audience for information being output (indicating how many people should be able to perceive the information), the user's desired level of privacy for information being output (indicating the group of people who are allowed to perceive the information), and the user's desired level of solitude (indicating the user's current desire to avoid intrusions).

User condition variables can also represent abstract principles about the user and the surrounding environment, such as the user's relationship to other objects, people, or locations (e.g., being at their desk, being in their office, being near the drug store, talking to a particular person, etc.). In some embodiments, CDOS systems can supply information about user condition variables and their values to other CDOS systems, and those other CDOS systems can add the user condition variables and/or values to their model of their user condition if appropriate (e.g., ambient air temperature, or an emotional state of a CDOS system's user that is sensed by another CDOS system).

The values for the user condition variables can directly impact how and when output information should be presented. For example, when the cognitive load is high or the degree of interruptibility is low, output information may be presented on a tactile display using light pressure so that the presentation is minimally intrusive on the user. Alternately, the presentation of the information may be deferred if no appropriate output device is available or if interrupting the user is not warranted by low-importance or low-urgency information. When the output information is sensitive and others present are not included in the current desired level of privacy, the information may be presented on an eyeglass-mounted display, or the information may be presented via an earpiece speaker when the scope of audience or intrusiveness on the surrounding environment dictates that others not perceive the presented information. Finally, if the user's desired level of solitude indicates that the user does not want to receive output information (e.g., while asleep, in the bathroom, involved in an intimate activity, etc.), presentation of all output information or of all but highly urgent and important output information may be deferred.

Those skilled in the art will appreciate that the User Characterization Module may receive contradictory information related to one or more aspects of the user condition. For example, a motion sensor device may indicate that no one else is present in a room, while a speech recognizer may report that another person is present. Mediation of such contradictory data can be handled in a variety of ways. For example, it may be possible to reconcile such data (e.g., the user is communicating with another person via a telephone with a loudspeaker). Alternately, the data could reflect different readings for changing conditions (e.g., ambient air temperature may have changed quickly after a window was opened). Alternately, when data truly conflicts, it may be impossible to reach a conclusion about a user condition variable, or the value of the variable may be represented as having varying degrees of uncertainty or belief. Both particular information sources (e.g., sensors) and particular pieces of input information can be categorized as to their quality and reliability to assist with mediation or to better model the user condition. In addition, input information can be time-stamped and otherwise identified to assist the User Characterization Module.

Those skilled in the art will also appreciate that a variety of factors can influence the determination of values for each of the condition variables, and that the values for the variables can be stored in a variety of ways (e.g., a number on a scale of 1-100 or 0-255, a probability distribution, a value from a delimited set of possibilities, a fuzzy logic value, etc.). Factors which can affect the cognitive load of a user include if the user is talking (and the volume of the speech), is talking on the phone, physical movement such as walking or driving, being stationary, being seated and stationary, ambient light and sound, stress and hunger levels, a level of rest (e.g., a low level due to a recent lack of sleep), activity such as reading e-mail or riding a bull, historical data (e.g., user has low threshold for cognitive load while watching baseball games), a physical or mental disability, location (e.g., at home or therapist's office), presence and frequency of user input such as keyboard or mouse activity, presentation of output information to the user, emotional state, explicit indications from user, etc. Similarly, factors that can affect desired level of privacy and desired scope of audience include the identity of others near the user, the proximity of others to the user, explicit tagging of activities or information (e.g., email in my personal account is private for only me, while email in my family account is private for family members), nature of work being performed (e.g., balancing a checkbook, playing a computer game, or revising a business spreadsheet), location, historical data, explicit indications from user, etc.

Those skilled in the art will appreciate that when information is being processed and shared between multiple systems, it is necessary for a context to be shared so that a semantic understanding of what is represented by information can be conveyed. For example, merely reporting data for air temperature as being 50 is insufficient. Not only is it unclear what scale is being used (e.g., Fahrenheit or Celsius), it is also unclear exactly what information is being represented (e.g., the air surrounding the user inside a heated room, or the outside air). Thus, the components of the CDOS system have a shared context as to the meaning of input information and user condition variables, including having consistency among the components generating values of the user condition variables (e.g., rules in the User Characterization Module) and those using the generated values (e.g., the Output Device Selector Module and Format Modules). In addition, when information from the CDOS system (e.g., user condition variables and their values) is shared with other entities (e.g., other CDOS systems or application programs with output information to be presented), sharing of the context with these other entities enables the information to be useful. In some embodiments, other systems are designed to share the same context (e.g., via a published API), while in other embodiments additional information describing the shared information can be supplied along with the shared information to establish a shared context.

In addition to there being a wide variety of factors which can affect various condition variables, the User Characterization Module can generate the model of the current user condition in a variety of ways. In one embodiment, the User Characterization Module includes a variety of rules such that when a test portion of the rule is currently true, then the result portion of the rule is activated or performed (e.g., to cause the value of a condition variable to be modified or to satisfy the test portion of other rules). For example, a rule could indicate that if the user is talking or the surrounding environment is loud, then non-auditory output is preferable to auditory output. When this first rule was satisfied, the result could trigger the satisfaction of a second rule, such as a rule stating that while non-auditory output is currently preferable then an eyeglass-mounted display device will be used for output. Alternately, a second rule could state that although non-auditory output is currently preferable, an earpiece speaker device will be used for highly sensitive information. Another example of a rule is that if the user is driving an automobile at high speed in bad weather conditions, it is likely that the user has a high cognitive load and would be unable to safely devote much attention to the computer system.

Those skilled in the art will appreciate that there are a variety of techniques for combining different types of input information and processing it to generating output information, including look-up tables, neural networks, expert systems, genetic algorithms, probabilistic belief networks, etc. In addition, values for some user condition variables may be calculated only periodically or only upon specific request for the value (e.g., computationally intensive variable values such as those generated by a face recognizer), even if the appropriate input information is supplied more frequently. Conversely, some embodiments of the CDOS system may allow the User Characterization Module to request or retrieve the appropriate input information needed to calculate one or more user condition variables, thus performing demand-driven processing. An illustrative example of a User Characterization Module is described in greater detail with respect to FIG. 4.

In some embodiments, CDOS systems can supply to other CDOS systems various information related to generating the model of the user condition, and those other CDOS systems can use that model generation information in addition to or in place of their own model generation information. For example, if rules are being used to generate the model of the user condition, one CDOS system can supply some or all of its rules to other CDOS systems. Similarly, default and/or specialized sets of model generation information can be supplied to a CDOS system, either from other CDOS systems or by loading that information onto the CDOS system. A default set of rules may be used by CDOS system until learning by the system adds or modifies the default rules to better model the user of the system. Similarly, other programs (e.g., application programs) can supply rules to the CDOS system, such as rules specific to that application program. Various specialized sets of rules can also be supplied. For example, sets of rules may be specialized based on occupation (e.g., a nurse, a secretary, a field technician, or a firefighter), gender (e.g., a woman's rules may understand physiological symptoms related to pregnancy or other female-specific conditions), age, or any of a variety of other specialization types.

After the User Characterization Module has created a model of the user's current condition, the Output Device Selector Module and the one or more Format Modules can then use the model to determine when and how to present output information to the user. The Output Device Selector Module first receives output information to be presented to the user (e.g., from an application program), and then selects an appropriate output device for presenting the information to the user. For example, if the model of the user condition indicates that auditory output is currently preferable to other forms of output and the output information can be presented audibly, then the Output Device Selector Module selects an output device that supports audible output. Alternately, the value of a desired level of privacy, desired scope of audience, or current cognitive load user condition variable may indicate that audible output is currently preferable.

While information to be presented to the user will often be generated by an entity outside the CDOS system, the CDOS system may also generate information to be presented to the user (e.g., an indication of low battery power, or of an error when adding a rule to the User Characterization Module). In addition, in some embodiments external entities such as an application program can directly access the model of the user condition and make their own determination as to when, where and how to present output information (i.e., bypassing the Output Device Selector Module and/or the Format Modules). Thus, if the modeled user condition indicates that particular output information should not currently be presented to a user, the external entity can postpone or cancel the presentation of the output information without ever supplying the output information to the CDOS system. It may also be possible to configure the CDOS system to automatically notify the external entities of the values of one or more user condition variables, such as by pushing that information to the external entities when changes occur in the values or by periodically notifying the external entities of the current values.

If the selected output device supports different ways to audibly present information (e.g., different audio levels or a choice of speakers) or the ability to output information to multiple senses, the Format Module for the output device will then format the output information appropriately based on the model of the user condition (e.g., lowering the volume to minimize the degree of interruptibility for non-urgent information or to prevent non-employees of the business from perceiving sensitive business information, or using 3-D sound that is output as if from a sound source located at a particular location in the user's surrounding environment). Alternately, if the current model of the user condition indicates that output to the user is currently inadvisable (e.g., the user has a high cognitive load, is asleep, or sensitive information cannot be safely presented in the current environment), the Output Device Selector Module instead defers or denies the presentation of the information.

In one embodiment, the Output Device Selector Module selects output devices by first characterizing each of the output devices relative to selected condition variables, such as cognitive load, desired level of privacy, desired scope of audience, and intrusiveness on the environment. For example, an eyeglass-mounted display may have a high rating for ability to present sensitive information to only the user, but may have a low rating for lack of intrusiveness on the user (particularly if the user has a high cognitive load from another visual activity). Similarly, an olfactory device which can output various smells may be low on the intrusiveness scale, but may be useful for presenting only limited types of output (e.g., a soothing aroma when the user has high blood pressure and a high pulse). Output devices can also be characterized on the basis of the user sense (e.g., olfactory or visual) to which the output information will be presented.

After the output devices have been characterized on the basis of the condition variables, the Output Device Selector Module then selects the one or more output device which are most appropriate for the user's current condition and for the information to be output. In some situations, a characterization of a device relative to a condition variable is dependent on the circumstances rather than being inherent in the capabilities of a device. For example, a stereo or a television may have a high degree of privacy while only the user is in the room, but the characterization for these devices may change to a low degree of privacy when others enter the room. In some embodiments, such devices are represented with a characterization that is a range of values, with only a single value or a subset of the range selected at a given time based on the current circumstances.

In addition to supplying the output information to be presented, an external entity can also supply information that describes the output information, such as the relative importance and urgency (i.e., the degree of deferability, such as time sensitivity) of the information, as well as the consequences of ignoring the information. In the same manner that the output devices can be characterized relative to condition variables, they can also be characterized relative to such factors in the description information. For example, an eyeglass-mounted display and an earpiece speaker with adjustable volume may both be highly-rated with respect to their ability to present important information that has a high consequence of being ignored. The earpiece speaker may have a wide range of ratings for these factors, however, since it is also able to present low importance information (e.g., at a low audio volume which can be easily ignored by the user if the user so chooses). Conversely, the eyeglass-mounted display may not be able to unobtrusively present visual information, and thus may have a small range of ratings for this factor. Thus, after the Output Device Selector Module receives the information to be output and optionally receives a description of the information, the Output Device Selector Module then uses the model of the user condition to determine which output device (if any) to use to present the information to the user, and a corresponding Format Module for that device determines the appropriate format with which to present the information to the user.

In one embodiment, the Output Device Selector Module includes a characterization of each output device available to the CDOS system relative to the user condition variables of cognitive load, desired level of privacy, desired scope of audience, and desired level of intrusiveness on others, as well as to output information description factors of relative level of importance, deferability, and consequence of ignoring. The one or more devices which best match the current user condition and the current output information will be selected, including using user preferences to select between different devices. Those skilled in the art will appreciate that the Output Device Selector Module could determine an appropriate output device in a variety of other ways, including receiving a direct specification from the entity supplying the output information, selecting the device with the widest range of capabilities relative to the type of information to be output, etc. In addition, a defined API (application program interface) can be designed between external entities such as application programs and the CDOS system. The defined API will allow application programs to supply information to User Characterization Modules, extract and add information to the model of the user condition, and supply output information and description information to Output Device Selector Modules. An illustrative example of an Output Device Selector Module is described in greater detail with respect to FIG. 5.

FIG. 1 illustrates a body-mounted wearable computer 120 worn by user 110, with the computer suitable for executing an embodiment of the CDOS system 100. The user has a variety of body-worn input devices including a microphone 124, a hand-held flat panel display 130 with character recognition capabilities, and various other user input devices 122. Similarly, the user has a variety of body-worn output devices that include the hand-held flat panel display, an earpiece speaker 132, an eyeglass-mounted display 134, and a tactile display 136. In addition to the various body-worn user input devices, the CDOS system can also receive information from various body-worn user sensor devices 126 and environment sensor devices 128. As the user moves about in various environments, the CDOS system receives various input information, maintains a current model of the user condition, and presents output information to the user via appropriate output devices.

In the current environment, the user is accessible to a computer 150 (e.g., in close proximity to or reachable via a long-distance communication device such as a cellular phone) which also has a variety of input and output devices. In the illustrated embodiment the computer is non-portable, although the body-mounted computer of the user can similarly communicate with a variety of other types of computers, including body-mounted computers of other users. The devices from which the non-portable computer can directly receive information include various user input devices 152 and various user sensor devices 156. The non-portable computer can output information directly to a display 160, a speaker 162, an olfactory device 164, and a printer 166. In the illustrated embodiment, the body-mounted computer can communicate with the non-portable computer via a wireless transmission medium. In this manner, the CDOS system can receive information from the user input devices 152 and the user sensor devices 156 after the information has been transmitted to the non-portable computer. Alternately, the body-mounted computer may be able to directly communicate with the user input devices 152 and the user sensor devices 156, as well as with other various remote environment sensor devices 158, without the intervention of the non-portable computer 150. Similarly, the body-mounted computer may be able to supply output information to the display 160, the speaker 162, the olfactory device 164, and the printer 166, either directly or via the non-portable computer, and directly to the telephone 168. As the user moves out of range of the remote input and output devices, the CDOS system will be updated to reflect that the remote output devices are not currently available to receive output.

Those skilled in the art will appreciate that computer systems 120 and 150, as well as their various input and output devices, are merely illustrative and are not intended to limit the scope of the present invention. The computer systems may contain additional components or may lack some illustrated components. For example, it is possible that the CDOS system could be executed on the non-portable computer, with the body-mounted computer replaced by a thin client such as a transmitter/receiver for relaying information between the body-mounted input and output devices and the non-portable computer. Alternately, no devices or computers may be worn by the user.

In addition, the body-mounted computer may be connected to one or more networks of other devices through wired or wireless communication means (e.g., wireless RF, a cellular phone or modem, infrared, physical cable, a docking station, etc.), either with or without support from other computers such as the computer 150. For example, the body-mounted computer of a user could make use of output devices in a smart room, such as a television and stereo when the user is at home, if the body-mounted computer can transmit information to those devices via a wireless medium or if a cabled or docking mechanism is available to transmit the information. Alternately, kiosks or other information devices can be installed at various locations (e.g., in airports or at tourist spots) to transmit relevant information to body-mounted computers within the range of the information device.

Those skilled in the art will also appreciate that specialized versions of the body-mounted computer and CDOS system can be created for a variety of purposes. For example, a wearable defibrillator could be created such that the CDOS system monitors the user's physiological condition to determine whether output electrical energy needs to be supplied to the user, and to automatically supply such output energy when needed. Alternately, a breathing monitor system could monitor the user and take appropriate action if a breathing problem develops (e.g., calling 911 or notifying a nearby medical care provider), or a sleep-sensing system for a driver of a vehicle could stimulate the driver (e.g., audibly or tactilely) when the driver becomes drowsy. A variety of other physiological conditions can be similarly monitored, and other specialized versions of the system can similarly be implemented (e.g., an aid for a deaf person that performs speech recognition on spoken words in order to visually display the words, or a mood enhancing device that triggers various soothing environmental output in response to a user condition such as stress or anger).

Figure 2:
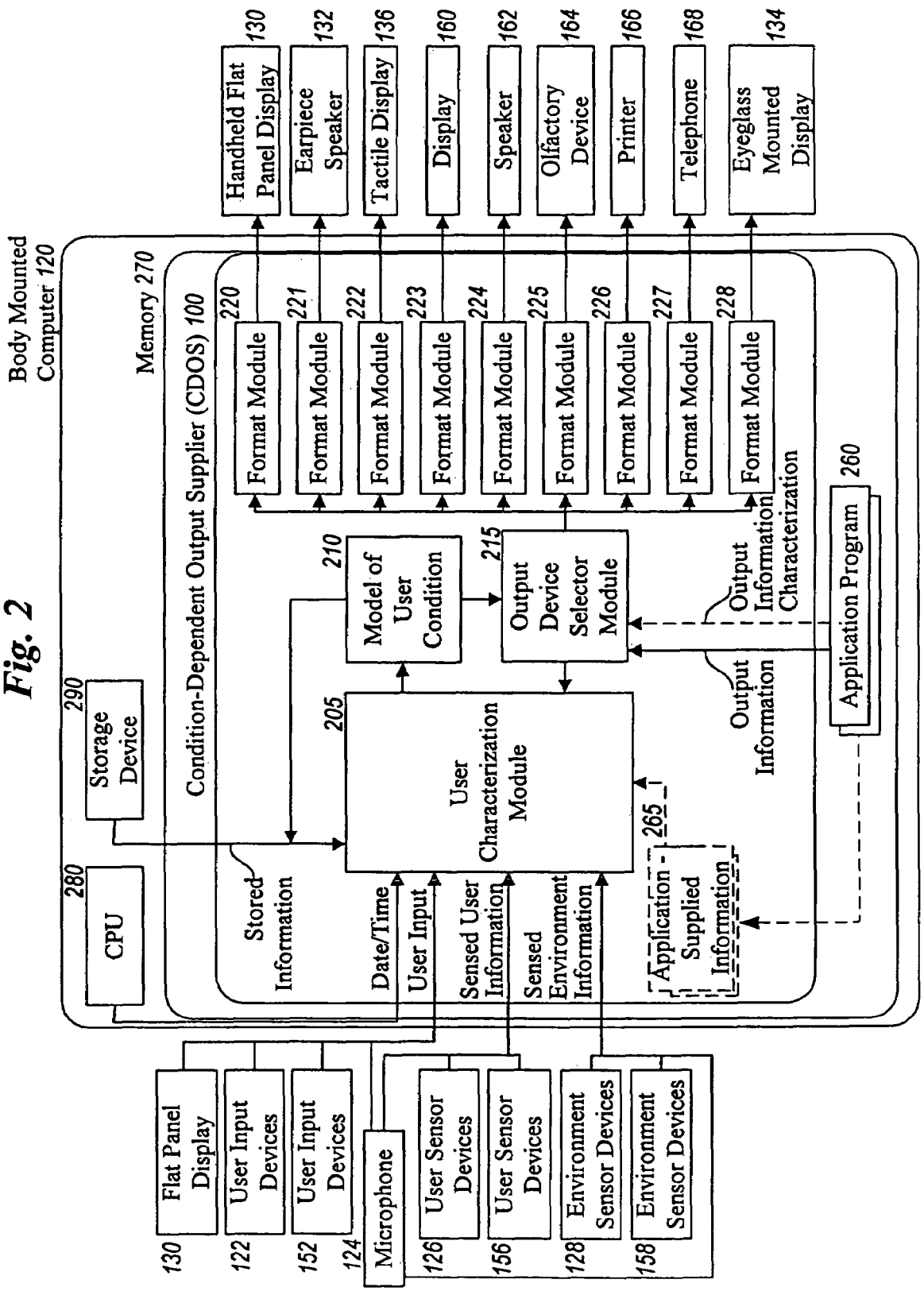
FIG. 2 is a block diagram illustrating the contents and information flow of an embodiment of the CDOS system.

FIG. 2 illustrates an embodiment of the body-mounted computer 120 in greater detail. The computer includes a memory 270, a CPU 280, and a storage device 290. The CDOS 100 system is executing in memory, as well as one or more distinct application programs 260. As the body-mounted computer receives various input information, the information is forwarded to the User Characterization Module 205 of the CDOS system. These types of information include explicit user input to the computer, sensed user information, and sensed environment information. The User Characterization Module can also receive date and time information from the CPU or from some other source, and can retrieve stored information (e.g., user preferences, definitions of various user-defined groups, or a default model of the user condition) from the storage device. It is also possible for one or more of the application programs to optionally supply application-supplied information 265 to the User Characterization Module. This information can include any type of user condition information to which the application program has access, such as user location or physiological state. In addition, the application programs can create new user condition variables (e.g., an indication of where the user's pupil is directed for an interactive game program), including those to be used only by that application program. Similarly, a utility program could supply user condition information that is useful to a specified subset of application programs (e.g., to various application programs from a single vendor or of a certain type).

After the User Characterization Module receives one or more of these types of information, it processes the information and creates a model of the user condition 210 which will include multiple user condition variables (with current values for some or all of the variables). After the model of the user condition has been created, the current model will be made available to the User Characterization Module to assist in the characterization of the user, such as with changes over time. The model will also be available to the Output Device Selector Module 215 to assist with presentation of output information. Moreover, the model of the user condition can additionally be stored in a permanent manner, such as on the storage device, if non-current versions of the user condition model are useful. Similarly, the User Characterization Module, Output Device Selector Module, and any Format Modules can be permanently stored before being executed in memory, and any changes made to the modules while they are executing can also be saved.

When the Output Device Selector Module receives output information to be presented, such as from one of the application programs, it uses the current model of the user condition as well as information about the available output devices to determine an appropriate output device on which to present the information to the user. In some embodiments, the Output Device Selector Module may retrieve information about the output device characteristics upon initialization, such as from the storage device. Alternately, the Output Device Selector Module could instead receive the information directly from the output devices as they are dynamically configured. The source of the output information can also supply a description of the information to assist in selecting where, when and how to present the information to the user. After an output device has been selected, the Output Device Selector Module forwards the output information as well as appropriate output information description factors and user condition variables to the Format Module for the output device. In the illustrated embodiment, Format Modules 220 through 228 correspond to the output devices as shown.

When a Format Module receives the output information, it formats the output information for presentation, with the formatting based in part on the information presentation capabilities of the output device. For example, the output device may be able to output information to more than one user sense, in more than one way, and with varying degrees of amplitude or style (e.g., flashing text or enlarged icons). The Format Module selects an appropriate method of formatting the information, such as to present the information to only the appropriate audience or with the appropriate level of intrusiveness, and then sends the information to its corresponding output device for display. The Output Device Selector Module will also inform the User Characterization Module when output is to take place so that the model of the user condition can be updated accordingly.

Those skilled in the art will appreciate that the Format Modules may communicate with their corresponding output devices in a variety of ways, and that the body-mounted computer in the CDOS system may contain additional components or may lack some illustrated components. For example, there may not be a one-to-one mapping between Format Modules and output devices, functionality performed by the Output Device Selector Module and Format Modules may be incorporated together, and the creation of the model of the user condition may be performed by a different system than that which uses the information to present output information. There may also be multiple User Characterization or Output Device Selector Modules, such as one User Characterization Module for each relevant high-level condition variable. Alternately, external entities such as the application programs could add their own User Characterization, Output Device Selector or Format Modules, or could directly access the model of the user condition in order to perform presentation of output information. Accordingly, the present invention may be practiced with other computer system configurations.

FIG. 3 is an illustrative example of a Model of User Condition 210. As is shown, the model reflects the condition of user X at time 14:22 hours on the displayed date. The illustrative model of the user condition includes a variety of user condition variables at different levels of abstraction, including low-level information directly from user sensors as well as higher-level abstract variables with characterized values that reflect a user's current physical and mental states. Historical and time-sensitive information can also be included, as shown by the variable illustrating the last user input performed by user X.

Intermediate-level variables included in the model can be calculated from low-level input information such as sensor values. For example, the speed of the user could be calculated directly by a sensor such as a pedometer, or could be calculated indirectly via information over time from a GPS sensor. In addition, the Speed variable indicates that additional information can be included in the user model for each variable. In the case of the Speed variable, uncertainty about the exact value of the variable is demonstrated. Other calculated condition variables include an indication that the user is located in their office, is near their desk, and that there are no other people physically nearby. These factors can be determined in a variety of ways, such as via a motion sensor device located on the desk that is tracking the user and the absence of other individuals, or by the lack of any sounds from any other people via one or more microphones.

Higher-level condition variables can also be calculated, such as the user's current physical activities, the current user cognitive load, the desired level of privacy, and the desired scope of audience. Information from the microphone or directly from the cellular phone could indicate that the user is currently talking on their cellular phone, and the speed and motion sensor data could indicate that the user is walking. Since the user remains near his desk even though he is walking, the system can deduce that the user is pacing about his office or is walking on a treadmill (not shown). The User Activity variable demonstrates that variables can have multiple values, and that information such as a degree of belief or certainty in the value for a variable can be added and used by the system.

The Cognitive Load variable indicates a score of 77 out of 100, thus indicating a relatively high cognitive load due to the combination of the user walking and talking on the phone. Since it is unlikely that information presented by the system will be desired to be perceptible by the person on the other end of the phone, the desired Scope Of Audience variable indicates that only the user is currently appropriate to receive output information. Since the User Characterization Module was able to identify the other person on the phone as Doug Smith, an executive level colleague at user X's company (e.g., by voice recognition or the use of that person's name), the desired Level Of Privacy variable indicates that if information is presented in a manner such that the other person can receive it (e.g., through an external speaker), general information about the company as well as executive-level sensitive information can be presented. Note that although low-level sensors such as a motion detector may have indicated that there are no other people physically nearby, when it was determined that the user was talking on a phone, additional information was added to the Nearby People variable to indicate that someone is within audio perception of the user.

The remaining displayed portions of the user condition model indicate that user preference information and externally supplied information can be included in the user condition model. For example, the Application X-Factor 1 variable has been supplied by application X, as well as a value for the variable. In this case, the value is a normal probability distribution with a mean of 23 and a standard deviation of 3. In addition, previously supplied user preference information could indicate which output devices and which output formats are preferred by the user. Alternately, the system could have automatically learned these preferences over time by observing user reactions to various outputs, as well as from explicit suggestions and overrides by the user. Those skilled in the art will appreciate that the illustrated user condition model is merely illustrative and is not intended to limit the scope of the present invention. The model may contain additional variables or may lack some illustrated variables, or may be represented without explicit condition variables at all.

FIG. 4 is an illustrative example of User Characterization Module 205. As is shown, the illustrated User Characterization Module is for user X and it includes a variety of IF-THEN rules. User condition variables are shown with angle brackets surrounding them, with some user condition variables (e.g., Speakerphone.Status) not shown in the illustrative model of user condition 210 in FIG. 3. In addition to the IF-THEN rules, WHILE-THEN rules are also shown, as well as an application-specific rule (i.e., the APPX: rule) added by an external application. The illustrative User Characterization Module also indicates that the results portion of the rules (shown after the THEN statements) can set or modify the values of condition variables, such as by absolute or percentage numerical amounts, and can indicate degrees of belief or uncertainty in values. Groups of people are shown in square brackets (e.g., Company Executives), and asterisks are wildcard characters that can match any information.

As mentioned previously, receiving input related to one user condition variable can cause multiple changes to propagate through the set of rules. For example, if input is received that indicates that the user condition variable Desktop.Motion.Sensor.Human.Movement is true and the User Activity variable value indicates that user is seated, one of the rules shown indicates that the Nearby People variable will be modified (if necessary) to indicate that an "Unidentified Person" is physically nearby. Modifying the Nearby People variable can then affect the Level Of Privacy or Scope Of Audience user condition variables as shown by other rules. Those skilled in the art will appreciate that the illustrated User Characterization Module is merely illustrative and is not intended to limit the scope of the present invention. The model may contain additional rules, may lack some illustrated rules, or may be implemented without using rules at all. In addition, the test and/or results portions of rules can be implemented as invokable functions, including those provided by external entities such as application programs.

FIG. 5 is an illustrative example of Output Device Selector Module 215. As is shown, the module is for user X and it maps each available output device to ratings for selected user condition variables and output information description factors. As is shown, some output devices which are available at times (e.g., pager 502, cellular telephone 504, and car radio 506) are not currently available. In addition, earpiece speaker 132 may not currently be able to receive output information if it is already in use (e.g., the user is listening to music). Alternately, new output information could preempt the current use of the earpiece speaker if necessary, or could instead share the use of the output device (e.g., outputting music to one ear and other information to the other ear if the earpiece speaker is part of headphones).

As is shown, the various output devices are rated with single values or a range of values for each factor. While textual values are used, those skilled in the art will appreciate that numerical or other types of rating systems could be used. In the illustrated embodiment, ranges may illustrate the device capabilities in different situations, with the ranges being restricted in any particular situation. For example, the earpiece speaker can accommodate when the user has a very low cognitive load by adjusting the volume to be slightly louder than the ambient environment. Alternately, even if the user has a high cognitive load, the earpiece speaker can interrupt the user if necessary for urgent information by using very loud volumes or distinctive tones. In addition, the ratings can be adjusted to reflect the specific situation of this user. For example, since the speaker 162 is located on the user's desk at work and other employees can frequently or always hear the speaker, the value for the desired Level Of Privacy may indicate that only business information be presented via the speaker. Alternately, the system could present information by sending it to the cellular telephone if the information is highly sensitive or it is important to interrupt the user. However, if others are present around the user, frequent use of the cellular telephone can be highly intrusive to them (particularly in environments such as a lecture or a movie).

Those skilled in the art will appreciate that the illustrated Output Device Selector Module is merely illustrative and is not intended to limit the scope of the present invention. The module may contain additional user condition variables and output information description factors, may lack some illustrated user condition variables and output information description factors; or may select output devices on which to present output information in an entirely different manner. In addition, some embodiments of the Output Device Selector Module may include specific logic, such as IF-THEN rules, to be used in conjunction with the mapping of output devices as shown.

Figure 6:
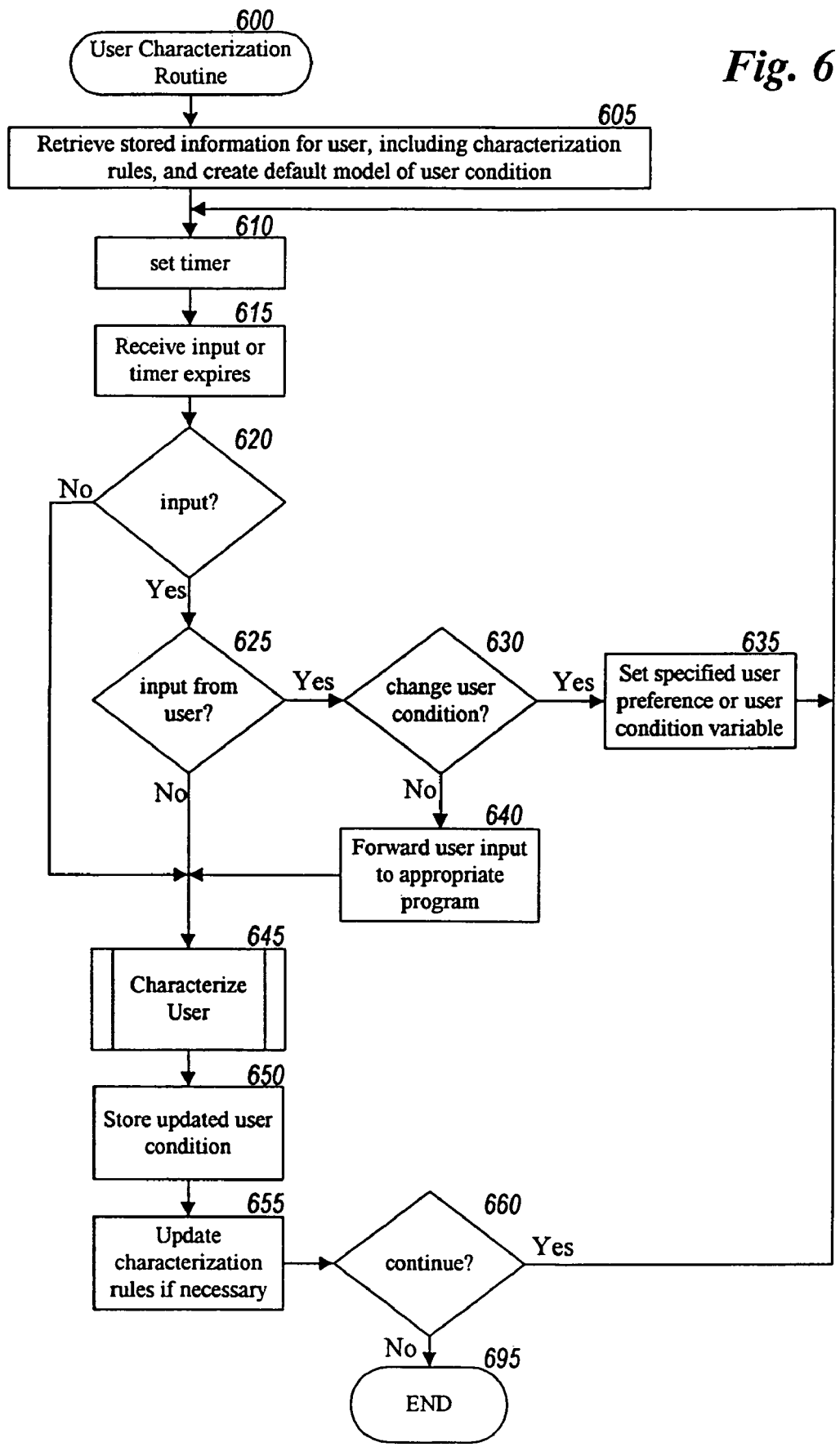
FIG. 6 is an exemplary flow diagram of an embodiment of the User Characterization routine.

FIG. 6 is an exemplary flow diagram of an embodiment of the User Characterization Routine 600. The User Characterization Routine retrieves stored information related to the user, including a default model of the user condition, receives various types of input information related to the user or the user's environment, updates the model of the user condition to reflect the new information, and periodically updates the model if no information has been received within a prescribed time. The routine begins at step 605 where stored information for the user is retrieved, including a set of characterization rules to be used by the routine,. The routine then creates a default model of the user condition, such as directly from stored information or by applying the characterization rules to default user information that is available. The routine then continues to step 610 to set a timer, and continues to step 615 to either receive input information or to receive a notification that the timer has expired.

The routine continues to step 622 to determine if input information was received. If so, the routine continues to step 625 to determine if the information received was information input to the computer by the user. If so, the routine continues to step 630 to determine if the user input indicates that the user condition should be modified, such as by setting a user preference or explicitly changing the value of a user condition variable. If so, the routine continues to step 635 to satisfy the user request, and then returns to step 610. If it was instead determined in step 630 that the user input was not directed to the User Characterization Module, the routine continues to step 640 to forward the user input information to the appropriate destination (e.g., an application program).

After step 640, or if it was determined in step 620 that the timer had expired or in step 625 that the information received was not user input, the routine continues to step 645 to execute the Characterize User Subroutine to update the model of the current user condition. After step 645, the routine continues to step 652 to store the updated user condition model, and then continues to step 655 to update the characterization rules if necessary. The characterization rules can be updated in a variety of situations, such as if an external entity (e.g., an application) explicitly adds a new characterization rule or if the routine monitors the user's behavior and reactions in an attempt to learn more appropriate characterization rules. After step 655, the routine continues to step 660 to determine if there is more information to receive. If so, the routine returns to step 610, and if not, the routine ends at step 695.

Figure 7:
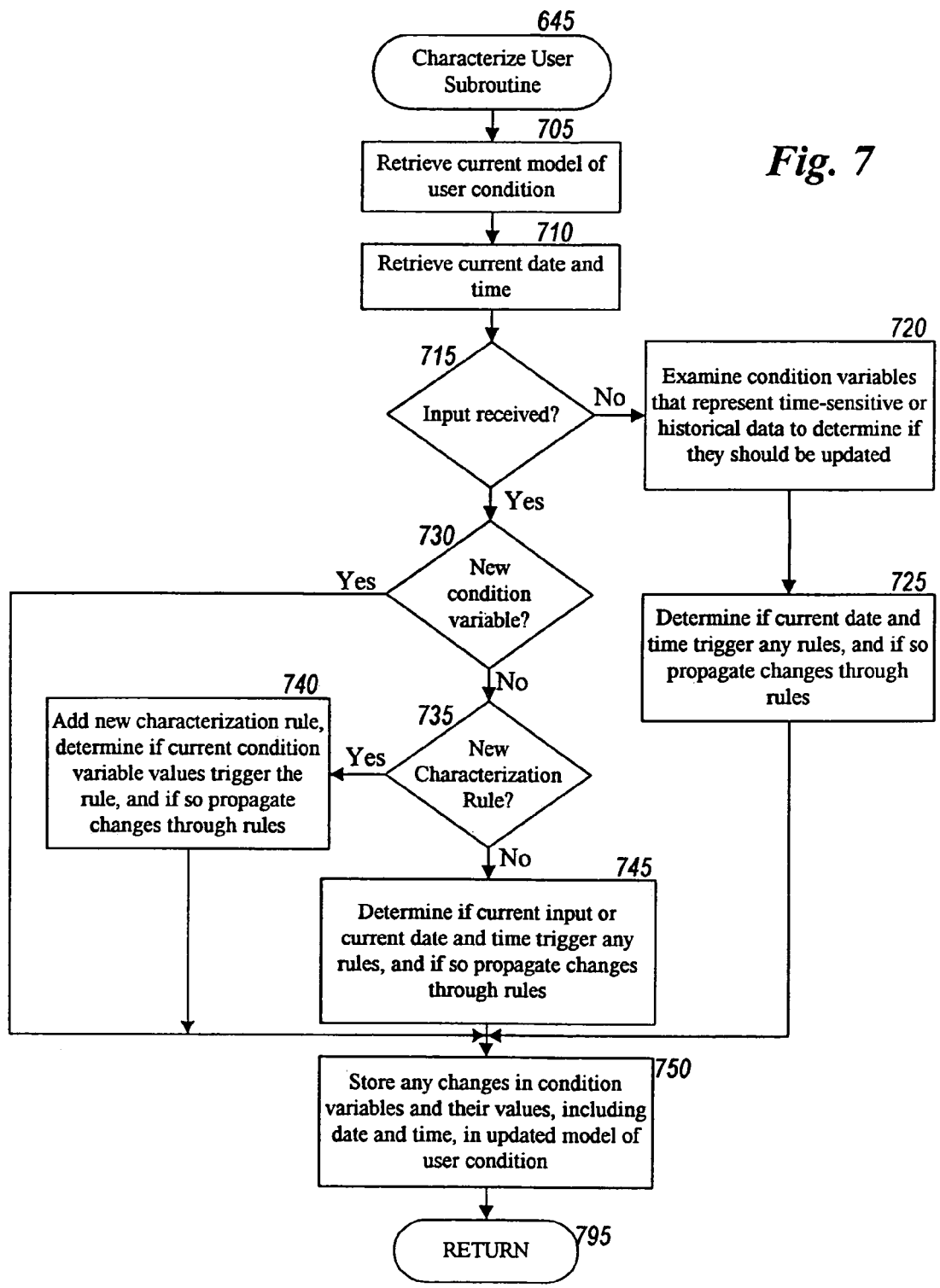
FIG. 7 is an exemplary flow diagram of an embodiment of the Characterize User subroutine.

FIG. 7 is an exemplary flow diagram of an embodiment of the Characterize User Subroutine 645. The subroutine is executed when information is received related to the user or the user's environment, or when a timer has expired indicating that no information has been received for a specified period of time. When no information has been received for a period of time, the model of the user's current condition may need to be updated so that time-sensitive information can be updated in the model of the user condition. The subroutine begins at step 705 where the current model of the user condition is retrieved. The subroutine then continues to step 710 to retrieve the current date and time. In step 715, the subroutine determines whether information was received or if the timer has expired. If the timer has expired, the subroutine continues to step 720 to examiner user condition variables that represent time-sensitive information or historical data and updates them if necessary. The subroutine then continues to step 725 to determine if the current date and time trigger any characterization rules, and if so, the changes from these triggered rules are propagated through the set of rules.

If it was instead determined in step 715 that information to be processed was received, the subroutine continues to step 730 to determine if a new user condition variable has been defined, such as by an application program, and if so continues to step 750. If a new user condition variable has not been defined, however, the subroutine continues to step 735 to determine if a new user characterization rule is being added, such as by an application program. If so, the subroutine continues to step 740 to add the new characterization rule, determine if current values for any user condition variables trigger the rule, and if so propagates any changes from the triggered rules through the set of rules. If it was instead determined in step 735 that a new characterization rule is not being defined, the subroutine continues to step 745 to determine if the current input information or the current date and time trigger any rules, and if so, changes from those triggered rules are propagated throughout the set of rules. In addition to information received directly from the user, sensors, or application programs, this input information can also be a notification from the Output Device Selector that indicates output information is currently being presented to the user.

After steps 725, 730, 740, or 745, the subroutine continues to step 750 to store any changes in user condition variables and their values, as well as the new date and time, in an updated model of the user condition. The subroutine then continues to step 795 and returns. Those skilled in the art will appreciate that a variety of types of information related to the user and the user's environment can be received, and that the User Characterization Routine and the Characterize User Subroutine can process this information in a variety of ways, including other than with sets of IF-THEN rules.

Figure 8:
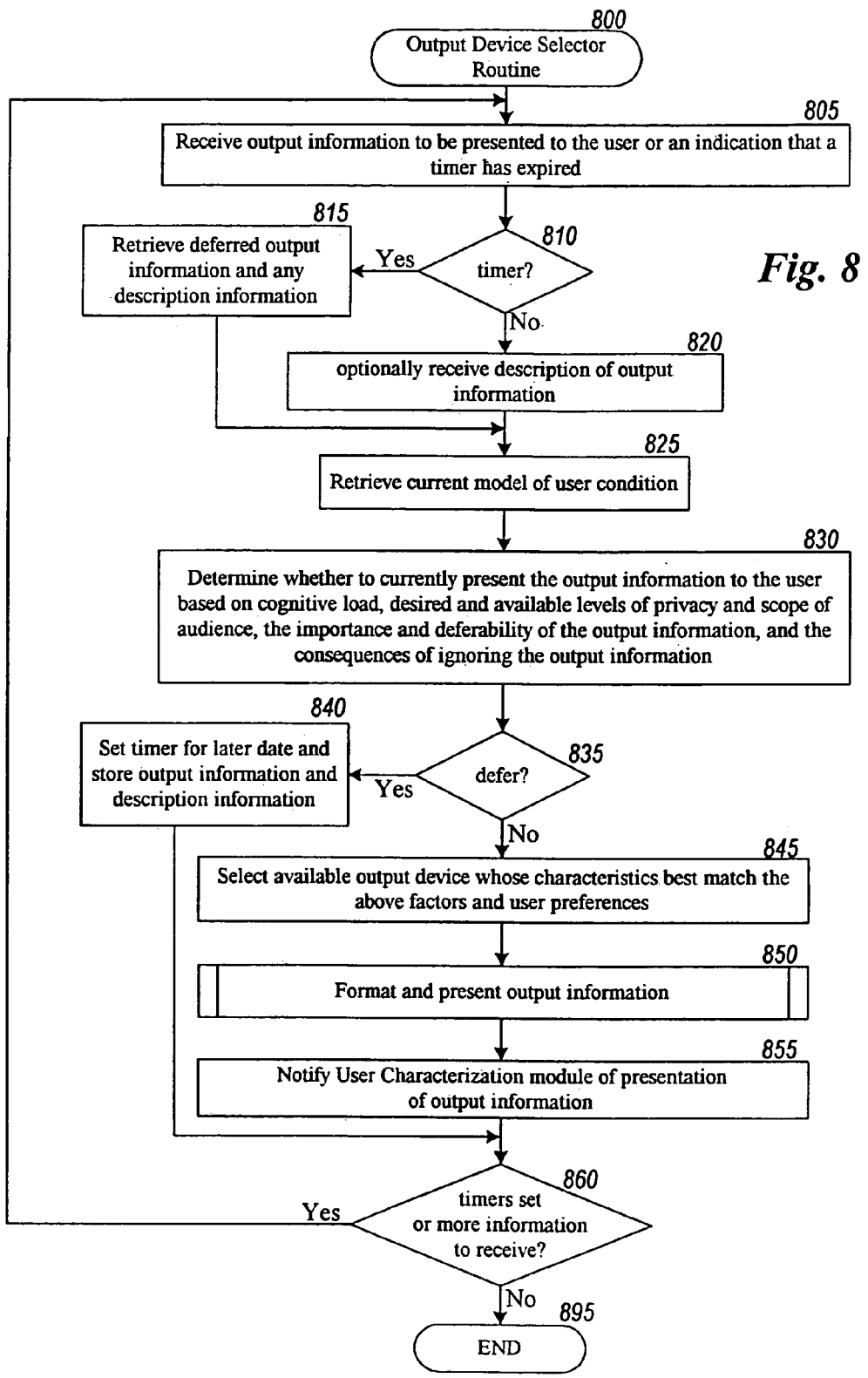
FIG. 8 is an exemplary flow diagram of an embodiment of the Output Device Selector routine.

FIG. 8 is an exemplary flow diagram of an embodiment of the Output Device Selector Routine 800. The Output Device Selector Routine receives output information to be presented to the user, retrieves current characterized information about the user from the model of the user condition, determines whether the output information should be presented to the user at this time and if so on which output device and in what format, and then notifies the User Characterization Module when output information is presented to the user. The routine begins at step 805 where output information to be presented to the user is received or an indication that a timer has expired occurs. The routine continues to step 810 to determine if a timer has expired. When output information cannot be currently presented to the user (e.g., no satisfactory output device is available or presentation to the user could be dangerous or inappropriate), the presentation is deferred and a timer is set to indicate when to review presenting the information. Thus, if it is determined in step 810 that a timer has expired, the routine continues to step 815 to retrieve the deferred output information for the timer, as well as any description information for the deferred output information. If it is instead determined in step 810 that new output information to be presented has been received, the routine continues to step 820 where description information for the output information is optionally received.

After steps 815 or 820, the routine continues to step 825 to retrieve relevant information from the current model of the user condition. The routine then continues to step 830 to determine whether to currently present the output information to the user. In the illustrated embodiment, this determination is made using the user condition variables of cognitive load, desired level of privacy, and desired scope of audience. In addition, available description information which indicates the importance and the deferability of the output information and the consequences of the user ignoring or not receiving the output information are considered, as is any user preference information. Current values for these user condition variables and description factors, as well as whether available output devices can support the necessary formatting of information (e.g., presenting information to the appropriate scope of audience or at the appropriate level of intrusiveness for the user's cognitive load), are thus used in the determination. Those skilled in the art will appreciate that other factors can be used for this determination or that the determination could be made in other ways.

The routine then continues to step 835 to determine whether the presentation of the information is to be deferred or not. If the presentation is to be deferred, the routine continues to step 840 to store the output information as well as its description information, and to set a timer for the information at which time the presentation of the output information will be reconsidered. If it is instead determined in step 835 that the information presentation is not to be deferred, the routine continues to step 845 where an available output device is selected. In the illustrated embodiment, the output device whose information display capabilities and ratings best match the user condition variables and description information factors of interest is chosen. The routine then continues to step 850 to execute the Format And Present Output Information Subroutine, and then continues to step 855 to notify the User Characterization Module of the presentation of the output information. After step 840 or step 855, the routine continues to step 860 to determine if there are currently timers set or there is more output information to be received. If so, the routine returns to step 805, and if not the routine ends at step 895.

Figure 9:
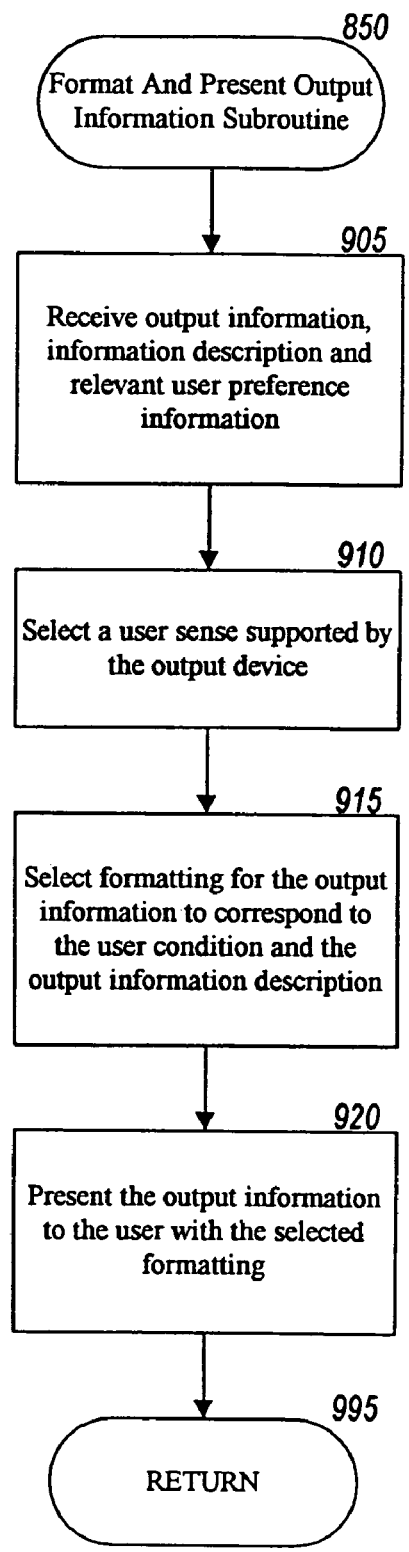
FIG. 9 is an exemplary flow diagram of an embodiment of the Format And Present Output Information subroutine.

FIG. 9 is an exemplary flow diagram of an embodiment of the Format And Present Output Information Subroutine 850. The subroutine receives output information to be presented and its description information, receives relevant user condition variables and user preference information, selects a user sense to which the output information will be presented (if the output device supports more than one), selects appropriate formatting with which to present the output information, and presents the output information to the user. The subroutine begins at step 905 where output information is received, as well as the description information factors, user condition variables, and relevant user preference information. The subroutine continues at step 910 to select a user sense that is supported by the selected output device.

In step 915, the subroutine selects formatting for the output information that is appropriate for the user condition variables, output information description, and user preferences. Those skilled in the art will appreciate the formatting of the output information will vary with each user sense (e.g., adjusting volume for the audio sense and adjusting pressure for the tactile sense), as well as with the specific output device. After the formatting for the output information is selected, the subroutine continues to step 920 to present the output information to the user with the selected formatting. If the Scope Of Audience and Level of Privacy user condition-variables indicate that the information can be presented to other people currently present and the selected output device supports such presentation, the information will also be presented to these other people. After step 920, the subroutine continues to step 995 and returns.

Those skilled in the art will appreciate that the selection of an output device and the formatting of the output information for that device can be performed in a variety of ways. For example, other user condition variables and description information factors could be used, or the selection could be made without resort to such information. For example, in one embodiment, the user could explicitly indicate the output device and formatting desired for some or all pieces of output information (e.g., in response to an notification from the system), or another entity (e.g., an application program supplying the output information) could explicitly designate the output device and/or formatting.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A computer-implemented method for presenting output information to a user, the method comprising:
generating a model of the user's current condition based upon received information about the user, the model representing a contemporaneous condition of the user and an environmental state, wherein the contemporaneous condition of the user includes at least a determined cognitive load of the user indicating a level of the user's ability to devote attention to the output information;
generating a device model for each of a set of output devices that maps a respective output device to a set of ratings for user condition variables and output information description factors, the user condition variables including at least a cognitive load variable that indicates a level of the user's cognitive load at which presentation of output information on the respective output device is allowable;
selecting an output device capable of presenting the output information in accordance with the model of the user's current condition and the device model; and
presenting the output information on the selected output device in accordance with the model of the user's current condition and the device model.

2. The method of claim 1, wherein the received information includes information related to a current condition of the user.

3. The method of claim 2, further comprising monitoring the user to collect the received information.

4. The method of claim 1, wherein the received information includes information related to a surrounding environment.

5. The method of claim 4, further comprising monitoring the surrounding environment to collect the received information.

6. The method of claim 1, further comprising receiving the output information before presenting the output information.

7. The method of claim 6, wherein an information provider transmits information to various computers within a transmission range of the information provider, wherein the method is performed by a transportable computer transported by the user, wherein the user transports the transportable computer within the transmission range, and wherein the received output information is the transmitted information.

8. The method of claim 1, wherein the level of the user's ability to devote attention to the output information is represented by the generated model of the user's current condition.

9. The method of claim 8, wherein the ability of the user to devote attention is influenced by information being received by the user via one user sense, and wherein the presenting of the output information is selected to be via a distinct user sense.

10. The method of claim 8, further comprising deferring the presenting of the output information when the ability of the user to devote attention is low.

11. The method of claim 8, wherein the indication of the ability of the user to devote attention is based on an estimate of an amount of attention devoted by the user to other current activities.

12. The method of claim 1, wherein the modeled user condition includes a preference of the user regarding a number of people allowed to perceive presented information.

13. The method of claim 12, wherein the selected output device includes a range of information presentation capabilities, wherein information presented via some of the information presentation capabilities is perceivable by other people near the user, and including selecting those information presentation capabilities to be used to present the output information when the modeled user condition indicates that the number of other people in the vicinity of the user is within the number of people allowed to perceive the output information.

14. The method of claim 12, wherein the selected output device includes a range of information presentation capabilities, wherein information presented via some of the information presentation capabilities is not perceivable by other people near the user, and including selecting those information presentation capabilities to be used to present the output information when the modeled user property indicates that the number of other people in the vicinity of the user exceeds the number of people allowed to perceive the output information.

15. The method of claim 1, wherein the modeled user condition includes a preference of the user regarding how to receive sensitive information.

16. The method of claim 15, wherein the selected output device includes a range of information presentation capabilities, wherein information presented via some of the information presentation capabilities is perceivable by other people near the user, and including selecting those information presentation capabilities to be used to present the output information when the modeled user condition indicates that sensitivity of the output information allows the other people to perceive the output information.

17. The method of claim 15, wherein the selected output device includes a range of information presentation capabilities, wherein information presented via some of the information presentation capabilities is not perceivable by other people near the user, and including selecting those information presentation capabilities to be used to present the output information when the output information is sufficiently sensitive that the modeled user condition indicates that the other people are not allowed to perceive the output information.

18. The method of claim 1, wherein a plurality of output devices are available to present information via distinct senses of the user, and wherein the selecting of the output device includes determining a user sense that is capable of presenting the output information in accordance with the modeled user condition.

19. A computer-readable medium containing instructions for presenting output information to a user by:
  monitoring the user to obtain information related to a current condition of the user, monitoring the user comprises utilizing one or more sensors to gather at least one of physiological, geographical or spatial information related to the user;
  monitoring a surrounding environment to collect information related to a state of the environment;
  generating a model of a user condition based at least in part on the obtained information, the model characterizes a current condition of the user and a user observable environmental state, the model includes condition variables that represent at least one of a cognitive load of the user, a desired level of privacy, a desired scope of audience, physical characteristics of the user, or physically observable environmental characteristics;
  generating a device model for each of a set of output devices that maps a respective output device to a set of ratings for user condition variables and output information description factors, the user condition variables including at least a cognitive load variable that indicates a level of the user's cognitive load at which presentation of output information via the respective output device is allowable:
  receiving output information to present to the user;
  employing the model of the user condition to determine the cognitive load of the user indicating a level of the user's ability to devote attention to the output information;
  selecting an output device capable of presenting the output information in accordance with the model of the user condition and the device model; and
  presenting the output information on the selected output device in accordance with the model of the user condition and the device model.

20. A computer system for presenting output to a user, comprising:
  an output device selector module that maps each of a set of output devices to a set of ratings for user condition variables and output information description factors, that receives information about a modeled property of the user that determines a level of the user's ability to devote attention to the output information, that selects an output device capable of presenting the output information based at least on a comparison of the modeled property with the set of ratings, and that presents the output on the selected output device in accordance with the modeled property wherein the user condition variables include at least a cognitive load variable that indicates a level of the user's cognitive load at which presentation of output information on the respective output device is allowed.

* * * * *

UNITED STATES PATENT AND TRADEMARK OFFICE
CERTIFICATE OF CORRECTION

| | | |
|---|---|---|
| PATENT NO. | : 7,512,889 B2 | Page 1 of 1 |
| APPLICATION NO. | : 11/069907 | |
| DATED | : March 31, 2009 | |
| INVENTOR(S) | : Dan Newell et al. | |

It is certified that error appears in the above-identified patent and that said Letters Patent is hereby corrected as shown below:

In column 1, line 9, after "continuation of" delete "co-pending".

In column 1, line 10, delete "flied" and insert -- filed --, therefor.

In column 1, line 11, before "which" insert -- now U.S. Pat. No. 6,874,127, --.

In column 1, line 14, delete "1998," and insert -- 1998, now U.S. Pat. No. 6,466,232, --, therefor.

In column 22, line 29, in Claim 19, delete "allowable:" and insert -- allowable; --, therefor.

Signed and Sealed this
Nineteenth Day of July, 2011

David J. Kappos
*Director of the United States Patent and Trademark Office*